Figure 1:
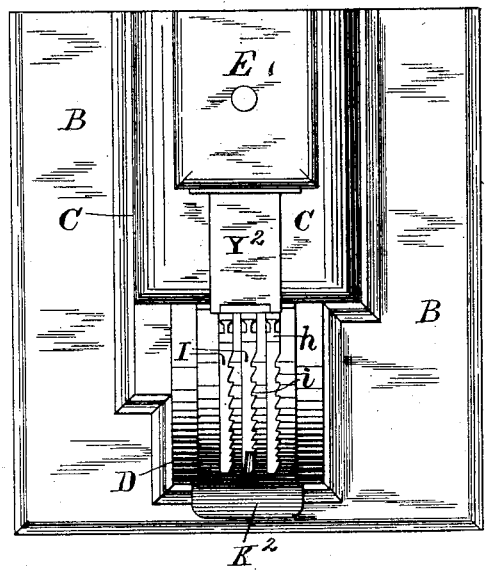

(No Model.)  5 Sheets—Sheet 1.

L. I. DARBY.
CASH REGISTER AND RECORDER.

No. 600,141.  Patented Mar. 8, 1898.

Attest:
Edw. F. Kinsey
Jacob Marx

Inventor.
L. I. Darby, per
Thomas S. Crane, Atty.

(No Model.)  
5 Sheets—Sheet 2.

L. I. DARBY.
CASH REGISTER AND RECORDER.

No. 600,141. Patented Mar. 8, 1898.

Attest:  
Edw. F. Kinsey  
Jacob Marx

Inventor.  
L. I. Darby, per  
Thomas S. Crane, Atty.

(No Model.) 5 Sheets—Sheet 3.

L. I. DARBY.
CASH REGISTER AND RECORDER.

No. 600,141. Patented Mar. 8, 1898.

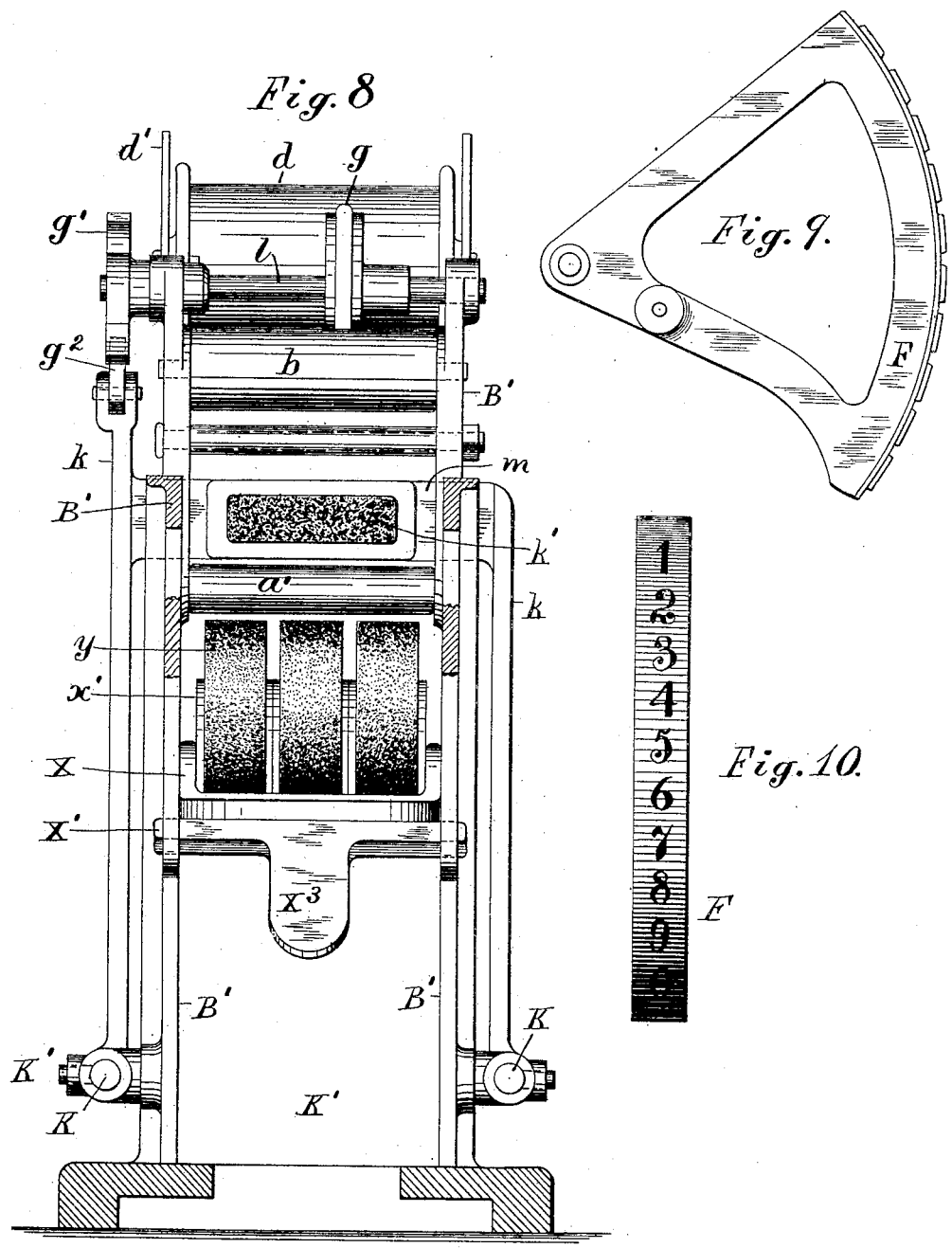

(No Model.)  5 Sheets—Sheet 5.
L. I. DARBY.
CASH REGISTER AND RECORDER.
No. 600,141.  Patented Mar. 8, 1898.
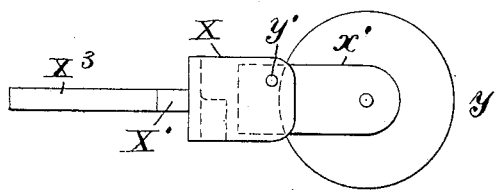
Fig. 11.
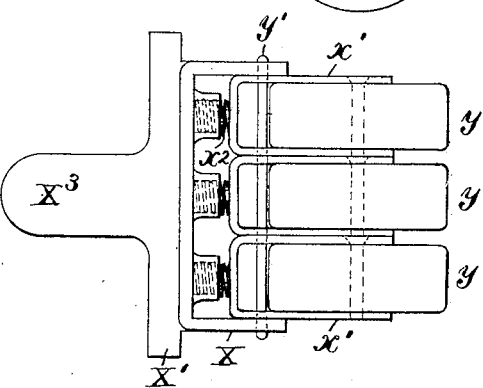
Fig. 12.
Fig. 13.
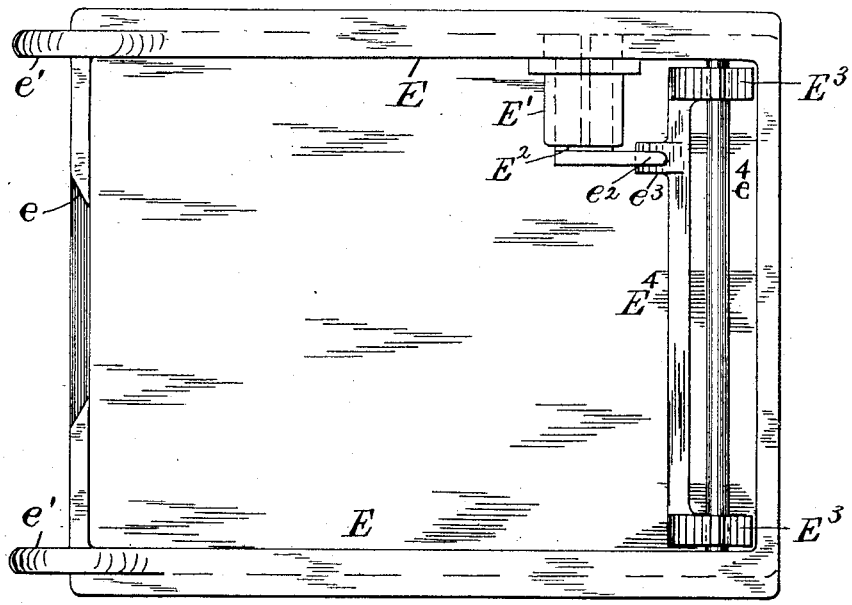
Attest:
Edw. F. Kinsey
Jacob Marx
Inventor.
L. I. Darby, per
Thomas S. Crane, Atty.

UNITED STATES PATENT OFFICE.

LEVI I. DARBY, OF NEWARK, NEW JERSEY, ASSIGNOR OF ONE-EIGHTH TO FRANK L. BROWN, OF NEW YORK, N. Y.

CASH REGISTER AND RECORDER.

SPECIFICATION forming part of Letters Patent No. 600,141, dated March 8, 1898.

Application filed April 19, 1897. Serial No. 632,729. (No model.)

*To all whom it may concern:*

Be it known that I, LEVI I. DARBY, a citizen of the United States, residing at Newark, county of Essex, State of New Jersey, have invented certain new and useful Improvements in Cash Registers and Recorders, fully described and represented in the following specification and the accompanying drawings, forming a part of the same.

The present invention relates to that class of cash-registering apparatus which operates to make a serial record of the payments registered; and the chief object of the present invention is to utilize the same device for recording and registering.

In the apparatus claimed herein the records of the successive payments are made by printing impressions serially upon a strip of paper, each impression being immediately exposed, and thus exhibiting a register of such payment without the necessity of employing a separate registering device. To effect the convenient inspection of such last record, the paper strip is preferably carried in a vertical position behind an aperture or sight-hole in the front of the inclosing casing, and the printing mechanism is arranged to impress the last record upon the printed strip adjacent to such aperture. The finger-keys for actuating the printing and feeding mechanism are arranged at the front of the casing, and the sight-hole exhibiting the last printed impression is directed toward the operator, who is thus enabled to perceive whether the payment has been correctly recorded.

The apparatus comprises a paper-reel having a long strip of paper wound thereon, a guide-roll over which the paper is carried contiguous to the sight-hole, a feeding device for intermittingly propelling the paper, and a series of printing-segments pivoted adjacent to the paper strip, with finger-levers linked thereto and finger-keys for actuating the same. The printing-segments and paper-reel are inclosed in a flat-top casing, with a portion of the feeding device projected upward through a hole in the top of such casing, and the sight-hole is formed in the front of a cover which is fitted upon the top of the casing at the rear end to inclose the feeding device. The segments are shown in the drawings pivoted in the front part of the casing and are actuated by a series of finger-levers pivoted upon a shaft at a much lower level and in front of the casing, so that the finger-keys may not obstruct the view of the register in the sight-hole. The finger-levers are inclosed in a casing concentric with their shaft and operate in slots provided each with ratchet-teeth upon one side, and a feed-lever is extended through the front of such casing and provided with a finger-bar by which such lever may be actuated to operate first a printed pad and then the feeding mechanism. Mechanism is connected with the feed-lever to shift the finger-levers laterally after each printing impression to disengage them from the ratchets, and thus permit their automatic return to their normal positions.

The apparatus is preferably used in connection with a cash-drawer fitted to a box beneath the register-casing, and a cam actuated by the cash-drawer may be used, as shown in the drawings, to shift the finger-bars laterally, so that they reëngage the ratchets only when the cash-drawer is closed and locked.

Various details of construction are claimed herein, which will be understood by reference to the annexed drawings, in which—

Figure 2:
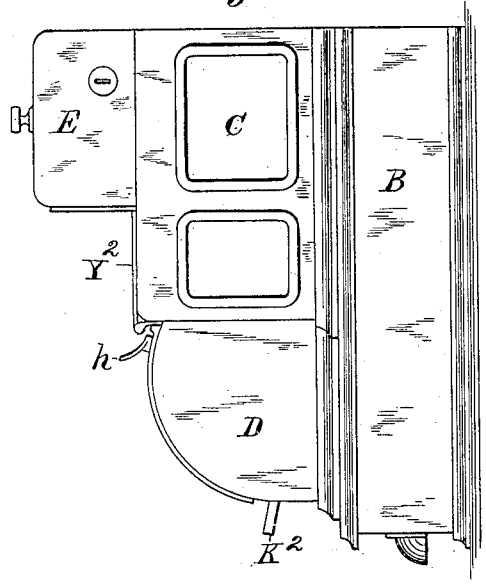
Figure 3:
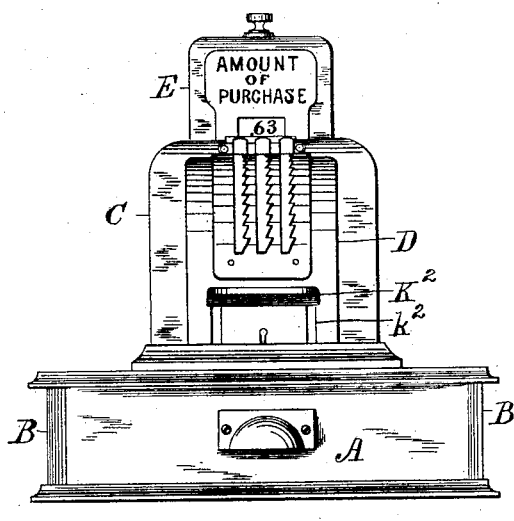
Figure 4:
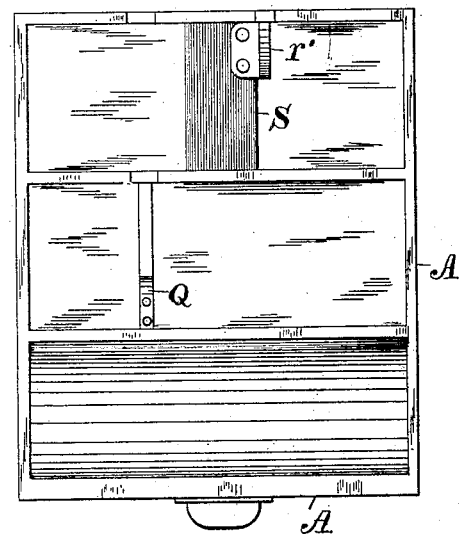
Figure 5:
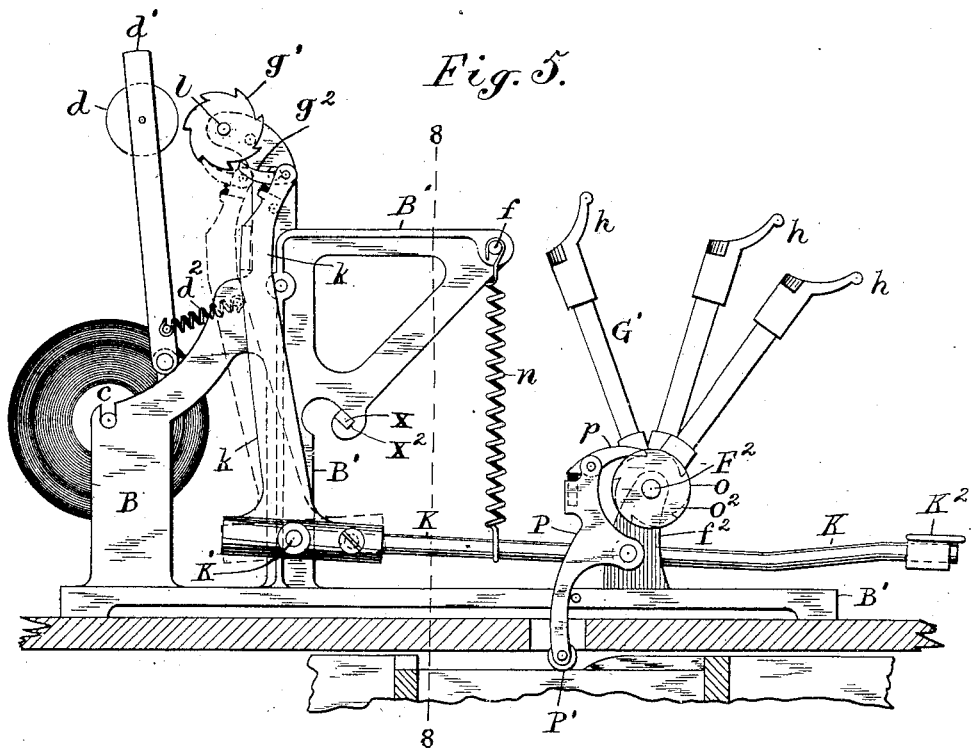
Figure 6:
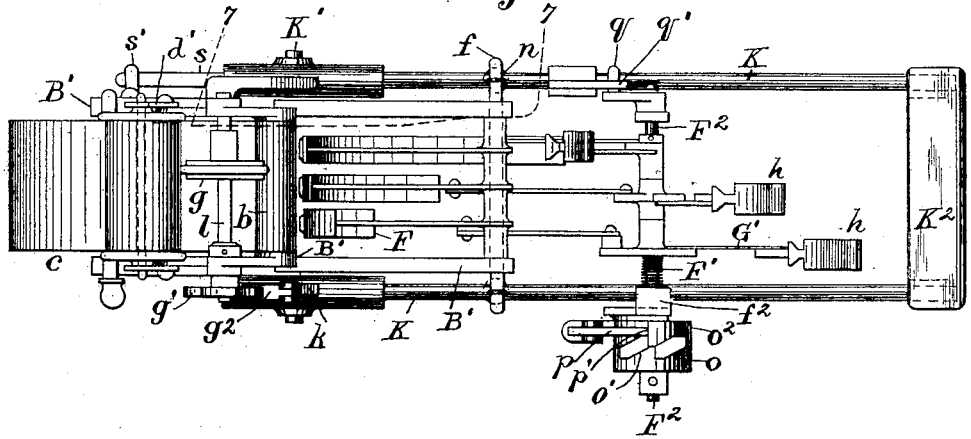
Figure 7:
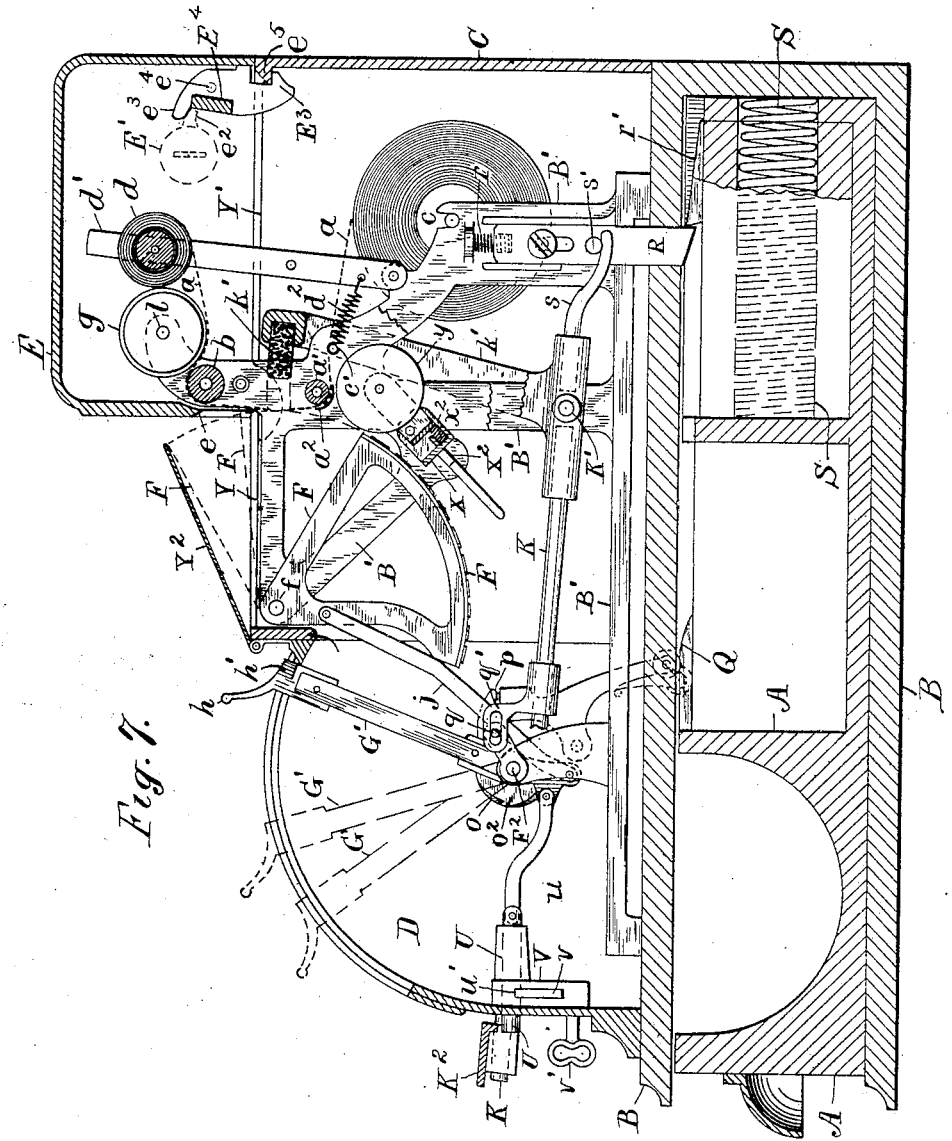

Figure 1 is a plan of the apparatus; Fig. 2, a side elevation of the same; Fig. 3, a front elevation, and Fig. 4 a plan, of the cash-drawer removed from its box. Fig. 5 is an elevation of part of the printing and the feeding device removed from the casing with a small portion of the cash-drawer bearing the cam. Fig. 6 is a plan of the apparatus removed from the casing. Fig. 7 is an elevation, partly in longitudinal section, on line 7 7 in Fig. 6. Fig. 8 is a transverse section on line 8 8 in Fig. 5, looking toward the guide-roll and printing-pad. Fig. 9 is a side elevation, and Fig. 10 a front elevation, of one of the printing-segments. Fig. 11 is a side view, and Fig. 12 a plan, of the inking-frame; and Fig. 13, a view of the under side of the cover, showing the locking device.

A designates the cash-drawer, and B the box inclosing the same, upon the top of which is mounted a frame B', supporting the mechanism of the apparatus. The mechanism is inclosed by a principal casing C, having the concentric housing D, fixed in front of the same, and the cover E, secured upon the top.

The casing C is shown rectangular, with the printing-segments F mounted upon a horizontal pivot $f$ in the upper front corner of the casing beneath an opening Y, which permits them to project upwardly when adjusted. The cover E is secured over an opening Y' in the rear of the opening Y and is provided in front with the sight-hole $e$, adjacent to the opening Y. A flap Y² is hinged to cover the opening Y and freely raised by the segments when adjusted. The paper strip $a$ is extended vertically behind the sight-hole, being guided by rolls $a'$ and $b$, arranged longitudinally above and below the top of the casing. The reel $c$ is mounted in the rear part of the casing and the paper strip carried therefrom over guide-bar $c'$ and the rolls $a'$ and $b$ to a take-up roll $d$, which is journaled in yielding levers $d'$.

A friction-wheel $g$ is mounted upon a shaft $l$, adjacent to the guide-roll $b$, and is driven intermittingly by a ratchet-wheel $g'$. The housing D is concentric with a shaft F², which is arranged in front of and below the pivot $f$ of the segments and is provided with a series of cranks G, which are connected by links $j$ to the segments F. Finger-levers G' are attached to the cranks G, with finger-keys $h$ upon their upper ends. The finger-levers are of thin metal, so as to yield laterally, and each finger-key is provided with a tooth $h'$, adapted to fit ratchet-teeth $i$, shown at the right-hand side of the slots I in the top of the housing D.

The hubs of the cranks G are movable laterally upon the shaft F² and are pressed normally toward the ratchet-teeth $i$ by a spring F', so that when the finger-keys are moved over the ratchet-teeth they will normally engage the same and hold the segments in a corresponding position.

A guard-plate $a^2$ is arranged in front of the roll $a'$ (above which the printing impression is made upon the paper strip) to keep the paper from accidental contact with the printing-segments during their adjustment. The ratchet-teeth $i$ are numbered "1," "2," "3," "4," "5," "6," "7," "8," "9," "0" from the top downward, and the type representing the figures "1," "2," "3," "4," "5," "6," "7," "8," "9," "0" are arranged upon the front of the segment in similar order, as shown in Fig. 10, so as to set the desired type in front of the paper above the guard $a^2$ when the finger-key is moved to a correspondingly-numbered ratchet-tooth.

In Fig. 7 one of the finger-keys is shown in normal position and the corresponding segment in its lowest or normal position, while two of the finger-keys are shown in dotted lines moved, respectively, to the ratchet-teeth numbered "3" and "6," and two of the type-segments are shown correspondingly elevated.

Ink-rolls $y$, formed of felt or soft material, are shown in Fig. 7 supported adjacent to the segments beneath the roll $a'$, and Figs. 11 and 12 show the construction of such frame, each roll being pivoted separately in a forked carrier $x'$, all of which are hinged upon a pivot $y'$ in the frame X and provided each with a separate spring $x^2$, adapted to tip the forked carrier in the frame and to press the roll $y$ elastically toward the type upon the segments.

The frame is provided with square lugs X' at the ends, adapted to fit a slot X² in the frame of the apparatus, from which it may be readily removed for repairs or reinking by means of a handle X³. The facility for removing the frame is evident by inspection of Figs. 5 and 7, the handle serving to apply the rolls $y$ to an inking-pad for renewing the supply of ink.

The elastic pressure of the springs $x^2$ upon the independent forked carriers enables each ink-roll to maintain contact with the type upon the printing-segments when the ink-rolls wear unequally.

The feed-lever has arms K, which are hinged upon pivot K', below the roll $a'$, outside of the frames B', and is provided with arms $k$, carrying a cross-bar $m$, as shown in Fig. 8, supporting an elastic printing-pad $k'$, which projects toward the paper strip $a$, so as to pass over the roll $a'$ and guard $a^2$ and press the paper against the type-segments, as indicated by dotted lines in Fig. 7. A feeding-lever is formed with arms at each side of the frame B', each arm projecting through a slot $k^2$ in the front of the housing D, where the arms are united by a finger-bar K².

The friction-wheel $g$ is so adjusted upon its shaft $l$ as to bear constantly upon the guide-roll $b$, the paper strip being thus pressed between such wheel and roll, so as to feed the paper by friction. The take-up roll $d$ is also pressed toward the friction-wheel by springs $d^2$, which act upon the levers $d'$, as shown in Fig. 7, and the friction-wheel thus operates to wind the paper at a uniform rate upon the take-up roll whatever the amount of paper which accumulates upon the latter.

The means for rotating the friction-wheel consists of a ratchet-wheel $g'$ upon the outer end of the shaft $l$ and a pawl $g^2$, pivoted upon an extension of one of the arms $k$, which thus serves both to actuate the printing-pad $k'$ and the ratchet-wheel for feeding the paper.

The lever-arms K are shown in Fig. 5 connected by springs $n$ with the ends of the pivot-bar $f$. Such springs permit the arms and the finger-bar K² to be depressed when forcing the paper against the type-segment by the printing-pad, the springs operating when the pressure is removed from the finger-bar to raise the arms and retract the pad, as shown in Fig. 7, at the same time moving the pawl $g^2$ into the position shown in dotted lines in Fig. 5, thus turning the ratchet-wheel $g'$ and winding the paper strip upon the take-up roll.

The rolls $a$ and $b$ are disposed so that the paper passes vertically in front of the same, and the printed impression made by the movement of the pad $k'$ is thus automatically shifted opposite the sight-hole $e$ by the upward movement of the feed-lever.

The registering of a payment is effected by moving the finger-keys forward in the slots I to set the printing-segments in the desired positions, the spring F' pressing the elastic arms G' toward the ratchet-teeth $i$, and thus engaging the teeth upon each finger-key with the ratchet. The segments are thus held while the finger-bar $K^2$ is depressed, which moves the printing-pad $k'$ forward against the paper strip $a$ to receive the impression from the type characters adjusted in front of such pad.

The release of the finger-bar $K^2$ permits the springs $n$ to reverse the movement of the feed-lever, which actuates the pawl $g^2$ and raises the printed impression opposite the sight-hole $e$.

In Figs. 5, 6, and 7 is shown a means of shifting the finger-levers laterally in the slots I as the feed-lever rises, thus disengaging the finger-keys from the ratchet-teeth $i$ and allowing the weight of the segments to restore the segments and keys to their initial position. This means consists of a crown-wheel $o$, fixed upon the shaft F outside of one of its bearings $f^2$. The crown-wheel is formed with slanting teeth $o'$, and a correspondingly-toothed disk $o^2$ is fitted loosely upon the shaft between the wheel $o$ and the bearing and held normally from rotation by a disk-pawl $p$, fitted to teeth $p'$ upon the periphery of the disk. A crank with pin $q$ is attached to the opposite end of the shaft $F^2$ and is actuated by one of the feed-lever arms K, through a slotted yoke $q'$, so as to turn one of the teeth upon the crown-wheel $o$ against the teeth of the disk $o^2$, and thus slide the shaft F longitudinally against the resistance of the spring F'. The teeth are formed with flat tops to rest upon one another at the completion of such movement, and thus lock the shaft with the finger-levers disengaged from the ratchet-teeth $i$ until the teeth are slipped past one another by the action of the cash-drawer. Such action is effected, as shown in Fig. 5, by a lever P, hinged upon the bearing $f^2$ and provided at its lower end with a roll P', which projects into the box B to engage a cam Q.

In Fig. 5 a portion of the box and drawer is shown with the cam drawn away from the roll P'; but in Fig. 7 the cam is shown in contact with the roll, thereby moving the end of the lever rearwardly and forcing the disk-pawl forward and turning the disk $o^2$ sufficiently to disengage the teeth upon the crown-wheel and disk. The spring F' is then able, by drawing the crown-wheel toward the bearing, to shift the finger-levers laterally where the projections $h'$ upon the finger-keys can engage the ratchet-teeth $i$. The closing of the drawer thus operates to reset the finger-levers in a condition to engage the ratchet-teeth $i$ and prevents the registering of a succeeding payment until the drawer is closed. A tubular socket S is fixed in the rear part of the drawer A, and a spiral spring S' is compressed therein, so as to act against the rear of the box and push the drawer normally outward. A bolt R is mounted upon the frame B' and pressed normally downward (by a spring $r$) through the top of the box to engage an inclined dog $r'$, which operates when the drawer is pushed in to lift the bolt and afterward to engage the same to lock the drawer shut. A projection or toe $s$ is extended from the feed-lever beneath a stud $s'$ upon the bolt and operates when the finger-bar $K^2$ is depressed in making a printing impression to retract the bolt and permit the drawer to open automatically under the influence of the spring S'.

In Fig. 1 the last printed impression, consisting of the figure "63," is exhibited at the sight-hole in correspondence with the adjustment of the finger-levers in Fig. 5, and the crank G' upon the finger-lever which prints the units figure is connected by link $u$ with a locking device to prevent the finger-lever from being depressed until such type-segment is moved. The finger-lever thus connected with the locking device must always be operated in order to open the cash-drawer. Such locking device consists of a slide U, fitted to a socket upon the front of the housing D and projected outside of the same beneath the finger-bar $K^2$, so that the finger-bar cannot be depressed until the slide is retracted by the connected finger-lever. The operator is thus prevented from actuating the feeding and printing mechanism except to record a payment by the previous adjustment of the printing-segments. The slide also serves to wholly prevent the use of the register and recorder (when desired) by means of a bolt $v$, fitted to a notch $u'$ in the under side of the slide U and movable within a locked case V in the usual manner, where it may be moved into and out of such notch by detachable key $v'$. When moved into the notch, the finger-lever for setting the segment to print the units figure cannot be moved by reason of its connection with the locked slide. The apparatus is thus constituted to prevent an improper use of the parts, as well as to secure it from operation by any unauthorized person who is not possessed of the key $v'$.

It will be understood that the permanent connection of the slide U with the crank-lever G by the link $u$ operates to reciprocate the slide through the lock-case V every time that the units finger-lever is operated, and anything which obstructs the movement of the slide prevents the actuation of the finger-lever, and thus forbids the use of the apparatus for registering and recording.

In the construction shown the moving of the bolt $v$ into the transverse notch $u'$ upon the slide wholly prevents the slide from reciprocating, and thus enables any person having the detachable key $v'$ to permit or to prevent the use of the apparatus at pleasure.

Only three of the type-segments are shown to register an amount not exceeding nine dollars and ninety-nine cents; but it is obvious that the number of segments and finger-levers can be increased without departing from the invention.

It will be clearly understood that it is the permanent record which is used to exhibit the registry of each payment, the last printed impression being automatically moved by the action of the pawl $g^2$ opposite the sight-hole $e$. It is therefore the record which indicates the registry, thereby avoiding the use of separate indicating wheels or tablets and the mechanism necessary to operate the same in addition to that required for printing the record.

The slide U may be termed a "stop," as it operates to stop the actuation of the feed-lever until the connected finger-lever is operated in setting the segment to print upon the paper. I have therefore claimed, broadly, a stop arranged to prevent the actuation of the feed-lever until the connected finger-lever is operated, as well as the slide locked by a bolt and key to hold the entire apparatus inoperative when desired.

To introduce the reel and take-up roll whenever necessary, the cover E is made removable and provided with a lock to prevent tampering with the roll or record. The cover is shown in Figs. 7 and 13 provided with hooks $e'$ to slip under the top of casing C and at the opposite end with a latch consisting of a bar $E^4$, having teeth $E^3$, fitted to catch under a hook $e^5$ upon the casing C, the bar being pivoted upon a rod $e^4$ and provided with a finger $e^3$ to coöperate with a lock. The lock is shown with cylinder lock-case $E'$, having rotary barrel $E^2$, from which a toe $e^2$ is extended against the finger $e^3$, so as to tip the bar $E^4$ when the barrel is rotated, and thus detach the teeth $E^3$ from the hooks $e^5$ upon the casing. The lock-barrel is rotated by a suitable key in the usual manner. When the cover E is thus locked, the hooks $e'$ secure the front end of the cover and the teeth $E^3$ the rear end. When the teeth $E^3$ are disengaged, the rear end of the cover may be lifted and the hooks $e'$ slid from under the top of the housing C, which wholly releases the cover from the casing and permits the operator free access to the reel and feeding appliances. The whole apparatus is thus safeguarded from interference by unauthorized persons, while the paper strip can be readily changed when necessary.

The finger-levers in my apparatus are pivoted upon a different shaft from the type-segments and are connected thereto by the links $j$, which construction permits the housing which incloses the finger-levers to be set below the level of the printing-point, (determined by the pad $k'$,) and thus avoids any obstruction to the view of the printed impression when the type-segments are dropped to their normal level after each operation of the device. This relation of the parts is clearly shown in Fig. 3, where the last-printed impression (represented by the registered figures ".63") shows through the aperture $e$ in the front of the cover E above the top of the housing D, which is due to the depressed situation of the segments and their setting devices and the vertical arrangement of the paper strip $a$ in front of the printing-pad $k'$.

Having thus set forth the nature of the invention, what I claim herein is—

1. In a cash register and recorder, the combination with feed-rolls for moving a paper strip vertically, and a pad to support the strip when printing, of type-segments oscillated contiguous to such pad, the guard-plate $a^2$ arranged before the paper strip just below the level of the pad, a series of cranks pivoted upon a shaft below the level of such pad and having link connection to the several segments, finger-keys with yielding finger-levers attached to such cranks, a housing concentric with the shaft and having slots with ratchets at one side to engage the finger-keys, a feed-lever with means for rotating the feed-rolls and for pressing the pad toward the segments, and a casing inclosing the printing devices and having an aperture to expose the last-printed impression, substantially as herein set forth.

2. In a cash register and recorder, the combination, with suitable feeding devices for propelling a paper strip, and a pad to support the strip when printing, of type-segments oscillated contiguous to such pad, a series of cranks pivoted upon a shaft with link connections to the several segments, finger-keys with laterally-yielding finger-levers attached to such cranks, a casing concentric with the shaft and having slots with ratchets at one side to engage the finger-keys, a feed-lever with pad for pressing the paper upon the segments, and means actuated by the feed-lever for pressing the finger-levers laterally to disengage them from the ratchets, as and for the purpose set forth.

3. In a cash-register having a cash-drawer, a box inclosing the same, and cash-recording mechanism mounted upon such box, the combination, with suitable feeding mechanism for propelling a paper strip, and a pad to support the paper when printing, of type-segments oscillated adjacent to such pad, a series of cranks pivoted to turn upon a shaft with link connections to the several segments, finger-keys with laterally-yielding finger-levers attached to such cranks, a housing concentric with the shaft and having slots with ratchets at one side to engage the finger-keys, a feed-lever for pressing the pad toward the segments, means actuated by the feed-lever for pressing the finger-levers laterally to disengage the finger-keys from the ratchets, and means actuated by the cash-drawer when closed, for replacing the finger-keys in contact with the ratchets, substantially as herein set forth.

4. In a cash-register, the feeding and printing mechanism consisting of the reel for a paper strip, the guide-rolls $a'$ and $b$ arranged one above the other, with a printing-pad and means for pressing the same upon the paper between said rolls, type-segments oscillated contiguous to the pad, with finger-levers and link connections to actuate such type-segments, a take-up roll with yielding bearings adjacent to the roll $b$, and a friction-wheel intermittingly rotated in contact with the paper upon the take-up roll, to feed the same uniformly, substantially as herein set forth.

5. In a cash-register, the feeding and printing mechanism consisting of a reel for a paper strip, the guide-rolls $a'$ and $b$ arranged one above the other, with a printing-pad and means for pressing the same upon the paper between said rolls, type-segments oscillated contiguous to the rolls, with finger-levers and link connections to actuate such type-segments, a take-up roll with yielding bearings adjacent to the roll $b$, a friction-wheel inserted between the roll $b$ and the take-up roll, and a feed-lever with ratchet operated to rotate the friction-wheel intermittingly at the close of the printing impression, substantially as herein set forth.

6. In a cash-register, the combination, with a paper-reel, a guide-roll, and the paper strip extended from the reel over such guide-roll, of type-segments oscillated contiguous to such paper strip, the inking-frame X supported removably adjacent to the segments, the series of separate forked carriers $x'$, pivoted in such inking-frame and provided with separate springs $x^2$, and the inking-wheels $y$, one for each of the type-segments, pivoted separately in the several carriers and spring-pressed toward the segments, as and for the purpose set forth.

7. In a cash register and recorder, the combination, with the flat-top casing C having the horizontal pivot $f$ mounted within its upper front corner, of the segments F journaled upon such pivot just below the top of the casing, with opening Y in the casing-top above the same, and contiguous opening Y' upon the top of the casing, of the paper-reel mounted in such casing, two guide-rolls supported respectively above and below the top of the casing, to support a vertical strip of paper contiguous to the edges of the type-segments, feeding devices projected upward through the opening Y' for intermittingly propelling the paper strip, a cover mounted detachably over the opening Y' upon the rear end of the casing-top with aperture in front of the paper strip, suitable finger-levers with connections for adjusting the type-segments, and the flap $Y^2$ hinged at the upper front corner of the casing and movable above the opening Y to be lifted by the segments when adjusted, substantially as herein set forth.

8. In a cash-register having a paper-reel, and printing-segments inclosed in a flat-top casing, the combination, with such segments and reel, of a guide-roll below and a guide-roll above the top of such casing, to guide the paper strip vertically, and suitable means for adjusting the printing-segments in front of such strip, a take-up roll adjacent to the upper guide-roll, a detachable cover inclosing the upper guide-roll and take-up roll, and provided with aperture to expose the printed impression, such cover having at one end hooks to engage the top of the casing, and at the opposite end a latch pivoted within the cover, with a hook upon the casing and a tooth upon the latch to engage such hook, and a lock having a rotary barrel with projecting toe, and a finger upon the latch to engage such toe, as and for the purpose set forth.

9. In a cash-register having type-segments, finger-levers to adjust the same, a paper-reel and feeding mechanism for shifting the paper contiguous to the segments, the combination, with the casing C inclosing the reel and feeding mechanism, and having the segments F pivoted within its upper front corner, guide-rolls to carry a portion of the paper strip vertically adjacent to the segments, and the cover E projected upwardly with aperture in the front side contiguous to such vertical portion of the strip, the shaft $F^2$ with finger-levers pivoted thereon, and connected by links to the segments, and the housing D concentric with the shaft $F^2$ and arranged in front of the casing C, with the finger-keys projected therethrough, the feed-lever projected through slot in the front of the housing D with finger-bar $K^2$ outside of such housing, and an impression-pad and devices for moving the feeding mechanism actuated by such lever, substantially as herein set forth.

10. In a cash register and recorder, the combination, with means for guiding and feeding a paper strip vertically, of type-segments oscillated contiguous to such strip, a series of cranks pivoted upon a crank-shaft with link connections to the several segments, finger-keys with laterally-yielding finger-levers attached to such crank, a housing concentric with the shaft and having slots with ratchets at one side to engage the finger-keys, bearings to support the crank-shaft with a spring to press the finger-levers toward the ratchets, a feed-lever with pad for pressing the paper upon the segments, a crown-wheel with slanting teeth fixed upon the crank-shaft with corresponding toothed disk in contact therewith, ratchet-teeth upon such toothed disk and pawl for holding the same, and a crank-arm with connection to the feed-lever for rotating the crank-shaft when the feed-lever is raised, to force the crown-wheel laterally and disengage the finger-keys from the ratchets, substantially as herein set forth.

11. In a cash-register having a cash-drawer, a box inclosing the same, and cash-recording mechanism mounted upon such box, the combination, with means for guiding and feeding a paper strip vertically, of type-segments oscillated contiguous to such strip, a series of cranks pivoted upon a shaft with link connections to the several segments, finger-keys with laterally-yielding finger-levers attached to such cranks, a casing concentric with the shaft and having slots with ratchets at one side to engage the finger-keys, and a spring to press them toward the ratchets, a feed-lever with pad for pressing the paper upon the segments, a crown-wheel with slanting teeth fixed upon the crank-shaft with corresponding toothed disk in contact therewith, ratchet-teeth upon such toothed disk and disk-pawl for holding the same, a crank-arm with connection to the feed-lever for rotating the crank-shaft when the feed-lever is depressed, to force the crown-wheel laterally and disengage the finger-keys from the ratchets, a lever carrying the disk-pawl and pivoted adjacent to the crank-shaft with arm extended through the top of the box contiguous to the cash-drawer, and a cam upon the cash-drawer to actuate such arm and move the pawl, so as to complete the movement of the toothed disk and permit the spring to shift the finger-keys into contact with the ratchets, substantially as herein set forth.

12. In a cash register and recorder, the combination, with a paper-reel and printing-segments inclosed in a casing having an opening in the top, of a guide-roll below and a guide-roll above the top of such casing, to guide the paper strip vertically through such opening, and suitable means for adjusting the printing-segments in front of such strip, the friction-wheel $g$ mounted upon shaft $l$ adjacent to the upper guide-roll and provided with ratchet-wheel $g'$, a feed-lever extended forwardly from the casing and provided with suitable finger-bar, and with arms $k$ extended upwardly with pad for pressing the paper against the segments, and an extension of one of the arms $k$ carrying the pawl $g^2$ to operate upon the ratchet-wheel $g'$, and springs to normally raise the finger-bar to actuate such pawl and feed the paper after each printing impression, substantially as herein set forth.

13. In a cash register and recorder, the combination, with a paper-reel and means for guiding a paper strip, of type-segments pivoted to oscillate contiguous to such strip, finger-levers with connections to adjust such type-segments, a feed-lever with pad for pressing the paper against the segments, feeding devices actuated by such feed-lever and operated to advance the paper after each impression, and a stop to prevent the actuation of such feed-lever, with connection to one of the finger-levers for retracting the stop, whereby the actuation of the feed-lever is dependent upon the previous actuation of such finger-lever, substantially as herein set forth.

14. In a cash register and recorder, the combination, with a paper-reel and means for guiding a paper strip, of type-segments pivoted to oscillate contiguous to such strip, finger-levers with connections to adjust such type-segments, a feed-lever with pad for pressing the paper against the segments, feeding devices actuated by such feed-lever and operated to advance the paper after each impression, a slide arranged to stop the actuation of such feed-lever, with connection to one of the finger-levers for retracting the slide, and a lock actuated by a key and provided with a bolt to engage the said slide to lock the same, and thereby hold the apparatus in an inoperative condition, substantially as herein set forth.

In testimony whereof I have hereunto set my hand in the presence of two subscribing witnesses.

LEVI I. DARBY.

Witnesses:
H. W. TICHENOR,
THOMAS S. CRANE.